US007103639B2

(12) United States Patent
Walton et al.

(10) Patent No.: US 7,103,639 B2
(45) Date of Patent: Sep. 5, 2006

(54) METHOD AND APPARATUS FOR PROCESSING UNIT SYNCHRONIZATION FOR SCALABLE PARALLEL PROCESSING

(75) Inventors: Andrew C. Walton, Rocklin, CA (US); Guy L. Kuntz, Chico, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1023 days.

(21) Appl. No.: 09/730,221

(22) Filed: Dec. 5, 2000

(65) Prior Publication Data

US 2002/0069270 A1 Jun. 6, 2002

(51) Int. Cl.
G06F 15/167 (2006.01)
(52) U.S. Cl. .......................................... 709/215; 712/12
(58) Field of Classification Search ................ 709/249, 709/100, 215; 713/2; 714/10, 11, 12, 30
See application file for complete search history.

(56) References Cited

U.S. PATENT DOCUMENTS

| 6,226,734 | B1 * | 5/2001 | Kleinsorge et al. ............ 712/13 |
| 6,247,109 | B1 * | 6/2001 | Kleinsorge et al. ............ 712/13 |
| 6,260,068 | B1 * | 7/2001 | Zalewski et al. ............ 709/226 |
| 6,269,390 | B1 * | 7/2001 | Boland ........................ 718/100 |
| 6,542,926 | B1 * | 4/2003 | Zalewski et al. ............ 709/213 |
| 6,594,756 | B1 * | 7/2003 | Datta et al. ..................... 713/2 |
| 6,622,260 | B1 * | 9/2003 | Marisetty et al. .............. 714/10 |
| 6,625,749 | B1 * | 9/2003 | Quach ........................... 714/10 |
| 6,633,916 | B1 * | 10/2003 | Kauffman .................... 709/229 |
| 6,675,324 | B1 * | 1/2004 | Marisetty et al. .............. 714/30 |
| 6,701,360 | B1 * | 3/2004 | Diesing et al. .............. 709/223 |
| 2002/0016891 | A1 * | 2/2002 | Noel et al. .................... 711/153 |
| 2002/0032850 | A1 * | 3/2002 | Kauffman ..................... 712/31 |
| 2002/0052914 | A1 * | 5/2002 | Zalewski et al. ........... 709/203 |

* cited by examiner

Primary Examiner—William C. Vaughn, Jr.
Assistant Examiner—Joseph Maniwang

(57) ABSTRACT

The present invention flexibly manages the formation of a partition from a plurality of independently executing cells (discrete hardware entities comprising system resources) in preparation for the instantiation of an operating system instance upon the partition. Specifically, the invention manages configuration activities that occur to transition from having individual cells acting independently, and having cells rendezvous, to having cells become interdependent to continue operations as a partition. The invention manages the partitioning forming process such that no single point of failure disrupts the process. Instead, the invention is implemented as a distributed application wherein individual cells independently execute instructions based upon respective copies of the complex profile (a "map" of the complex configuration). Also, the invention adapts to a degree of delay associated with certain cells becoming ready to join the formation or rendezvous process. The invention is able to cope with missing, unavailable, or otherwise malfunctioning cells. Additionally, the invention analyzes present cells to determine their compatibility and reject cells that are not compatible.

25 Claims, 3 Drawing Sheets

US 7,103,639 B2

METHOD AND APPARATUS FOR PROCESSING UNIT SYNCHRONIZATION FOR SCALABLE PARALLEL PROCESSING

RELATED APPLICATIONS

This application is related to co-pending and commonly assigned U.S. patent application Ser. No. 09/562,590, entitled "RECONFIGURATION SUPPORT FOR MULTI PARTITION COMPUTER SYSTEM," and co-pending and commonly assigned U.S. patent application Ser. No. 09/561,812, entitled "A SERVICE PROCESSOR WITH ALGORITHMS FOR SUPPORTING A MULTI PARTITION COMPUTER," the disclosures of which are hereby incorporated herein by reference.

TECHNICAL FIELD

The present invention relates to a system and method for organizing independently executing cells of a multi-partition computer system into a partition without creating a single point of failure, and more particularly to organizing cells into a partition via instructions executed in parallel on the respective cells.

BACKGROUND

Prior computer platforms have been symmetric multi processors (SMP) arrangements where multiple CPUs are running a single copy of the operating system (OS). The OS provides time sharing services to allow multiple applications to run. However, this arrangement permits the applications to interfere with each other. For example, if the system is running an accounting application, the accounting application may disproportionately allocate memory in the system, as well as processors that the OS can allocate. Then, when some other application needs processors or memory, for example a manufacturing application, it would not be able to allocate sufficient memory or processors for its needs, and therefore would exhibit unacceptable performance. Thus, the manufacturing application would have been significant slowed or otherwise adversely impacted by the accounting application. Also, this arrangement also leaves the system vulnerable to failures. Any problem with one application could cause all other applications to fail.

A known solution to this problem is to separate the computer system into partitions or protected domains. These partitions are hardware separations that place resources into separate functional blocks. Resources in one block do not have direct access to resources in another block. This prevents one application from using the entire system resources, as well as contains faults and errors. This solution presents its own problems. The partitions, once defined, are static in nature, and cannot be readily changed. Such systems are intolerant to faults. First, these systems require the presence of a configuration processor to manage the partition formation process upon boot-up. Thus, these solutions include a single point of failure. Secondly, if a particular resource is not present during the partition formation process due to fabric failure or other problems, an affected partition or even the entire system may be unable to function.

SUMMARY OF THE INVENTION

The present invention is directed to a system and method that flexibly manage the formation of a partition from a plurality of independently executing cells (discrete hardware entities comprising system resources) in preparation for the instantiation of an operating system instance upon the partition. Specifically, the invention preferably manages configuration activities that occur to transition from having individual cells acting independently, and having cells rendezvous, to having cells become interdependent to continue operations as a partition. The invention preferably manages the partitioning forming process such that no single point of failure disrupts the process. Instead, the invention is preferably implemented as a distributed application wherein individual cells independently execute instructions based upon respective copies of the complex profile (a "map" of the complex configuration). Also, the invention preferably adapts to a degree of delay associated with certain cells becoming ready to join the formation or rendezvous process. The invention is preferably able to cope with missing, unavailable, or otherwise malfunctioning cells. The invention preferably adapts to broken fabric connections between cells and missing I/O capability. Additionally, the invention preferably analyzes present cells to determine their compatibility and reject cells that are not compatible.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, reference is now made to the following descriptions taken in conjunction with the accompanying drawing, in which.

DETAILED DESCRIPTION

Figure 1:
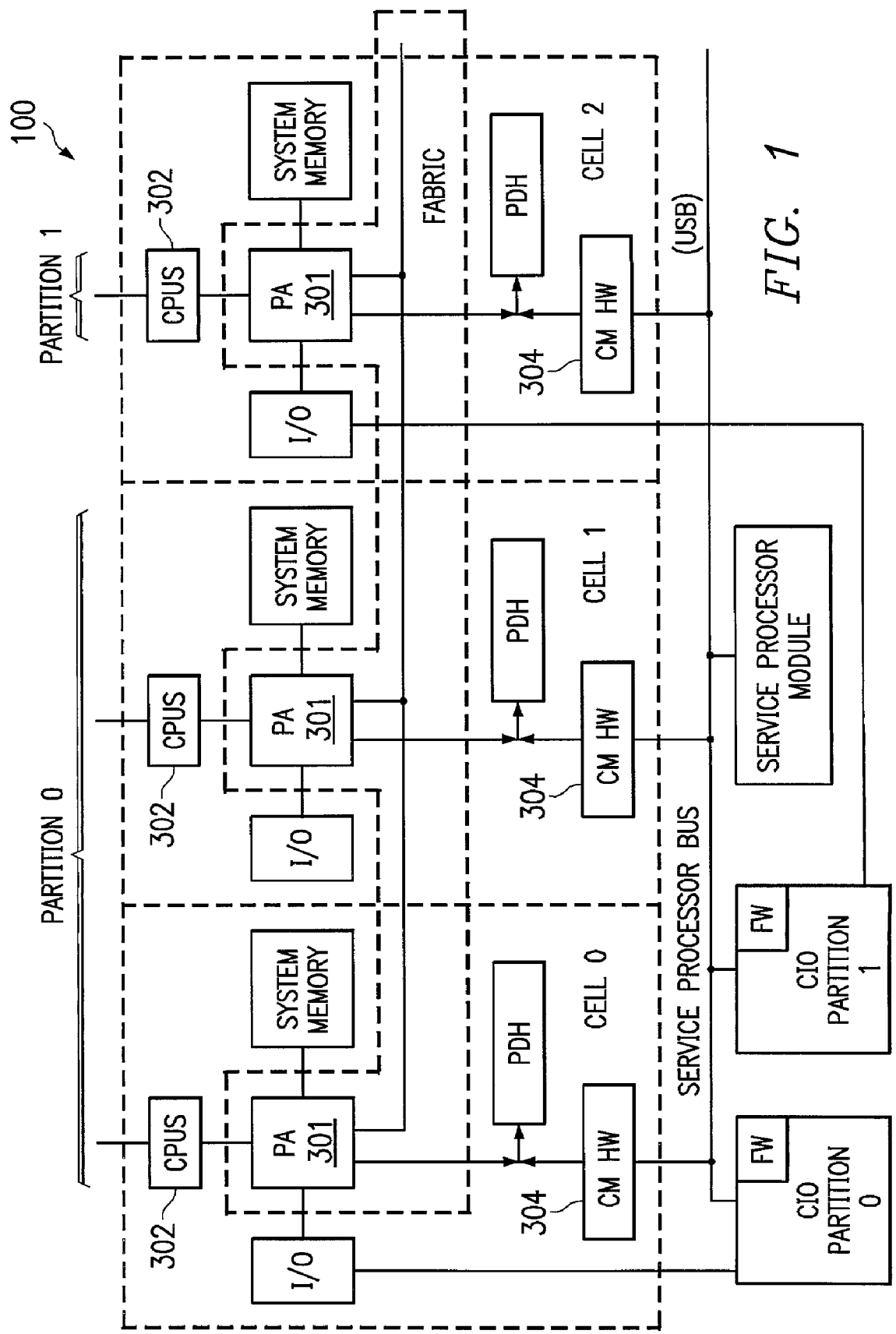
FIG. 1 depicts an exemplary multi partition architecture utilized to illustrate the present invention.

FIG. 1 depicts an exemplary architecture utilized to provide a conceptual framework to discuss the present invention. The specific configuration shown in FIG. 1 is solely provided for the purposes of illustration.

The utility subsystem 10 comprises one or more service processors 101 and associated infrastructure, including core I/O modules, and cell micro-controllers (CM) 304. Core I/O modules are resources associated with partitions and utility subsystem 10 to facilitate communication between partitions and utility subsystem 10 (such as communicating console data). Core I/O includes minimal I/O functionality that is required by a partition to boot. The function of the utility subsystem is to manage complex 100, including managing partitions when no system software is running. The service processor 101 is logically connected to CM 304 on each of the different cells, i.e. cell 0, cell 1 and cell 2, and also to the Core I/O module for each partition. The preferred implementation uses the Universal Serial Bus (USB) for the logical connection between components of the utility subsystem. However, any bus or method capable of conveying messages between the components could be used.

A cell is a circuit board containing one or more system processors, memory, an I/O connection module, a processor dependent hardware (PDH) module, and a CM module. PDH module preferably implements firmware utilized to boot-strap processors on the respective cell. Specifically, PDH module preferably implements instructions executed on CPUs 302 pertaining to the partition formation process as discussed in greater detail below.

The cell is the smallest unit that can be assigned to a partition. A partition is a cell or group of cells running a single copy of the operating system. A complex is an aggregation of a number of partitions. A complex may comprise multiple partitions and can run multiple copies of the operating system simultaneously. It may also run multiple different operating systems simultaneously. Partitions form protected areas, wherein different partitions are restricted by hardware from adversely effecting operations of other partitions.

The cells are shown connected by fabric. The fabric is a set of ASICs and physical connections on the backplane of each cabinet in complex 100, to which the cells are connected when installed. The fabric preferably routes processor bus operations (e.g. read, write) between the originating cell and memory, or I/O on the cell that contains the memory, or I/O addressed by the bus operation.

FIG. 1 also shows partition 1 comprised of cell 2. Partition 1 has system firmware and an OS and application software running on the processors of cell 2. Partition 1 and its running software are separate and isolated from partition 0—they share nothing, and are isolated from each other by hardware features in the processor agent (PA) 301. PA 301 preferably implements partition gating. Partition gating is utilized to create or enforce the partition scheme. Specifically, partition gating prevents cells that are not part of a given partition from completing an adverse transaction (for example, a write transaction) on a cell that is part of the partition. Partition gating provides the isolation that is desirable for partitioning. For example, if another partition crashes, its cells may briefly issue a large amount of traffic over the fabric. Cells from other partitions will detect that traffic. However, the cells pertaining to non-crashed partitions will not respond to the erroneous traffic whatsoever, since the partition gating functionality is programmed to ignore adverse transactions from cells that do not belong to the respective partitions. PA 301 is preferably programmable to variably configure permitted cells. Specifically, PA 301 may be programmed to limit transactions to a different set of cells upon each reset, reboot, or reconfiguration procedure.

It shall be appreciated that the preceding description is at a relatively high level. Specifically, actual implementations of multi-partition systems typically include a large number of partitions and respective cells. Moreover, the respective cells may comprise additional electronic components that are not shown in FIG. 1. FIG. 1 only depicts a level of detail necessary to provide a conceptual framework to discuss the present invention. Greater detail regarding the architecture, implementation, and operation of multi-partition systems may be located in co-pending and commonly assigned U.S. patent application Ser. No. 09/562,590, entitled "RECONFIGURATION SUPPORT FOR MULTI PARTITION COMPUTER SYSTEM," and U.S. patent application Ser. No. 09/561,812, entitled "A SERVICE PROCESSOR WITH ALGORITHMS FOR SUPPORTING A MULTI PARTITION COMPUTER," the disclosures of which are hereby incorporated herein by reference.

Before discussing the present invention in any appreciable amount of detail, it is appropriate to discuss how prior implementations manage the partition formation process. Specifically, the partition formation process may occur in association with powering on of the various system components which thereby results in the booting process. During such a procedure, the individual cells begin the boot process independently. For example, the cells may initialize memory, initialize I/O capabilities, and/or the like. The booting process of to individual cells is well known in the art and accordingly will not be discussed in any appreciable degree. Also, the booting process pertaining to the discrete cells does nothing specific concerning partitions. Therefore, it is sufficient to note that the initial booting process involves initialization of independently executing cells.

After the cells have been booted, the cells communicate with a central point of control in order to form the various partitions. The central point of control is typically implemented as an internal service processor dedicated to partition management activities, although an external processor or system may be utilized. The service processor directs the various cells and configures various components to create the isolation necessary for the partition scheme to function properly. Known implementations involve causing the service processor to rigidly construct the various partitions. Accordingly, reconfiguration and scalability are significantly restrained. Furthermore, the use of a central point of control creates a single point of failure that will cause the entire system to fail upon malfunction of the service processor. Moreover, known applications are intolerant of cell faults. Specifically, if a cell is not present at the appropriate time, known service processors are unable to adapt the partition scheme. Thus, a partition or even the entire system may be inoperable if a cell does not report during the partition formation process.

The present system and method differ from known solutions in that there is no reliance upon a central point of control. By utilizing a distributed approach, the system and method are far more tolerant of fabric failures, cell failures, cell delays in joining the partition formation process, non-compatible cells attempting to join a partition, missing core I/O capability, and/or the like. The present system and method achieve this flexibility by utilizing the various mechanisms as detailed herein below.

Before discussing the partition formation process in a linear fashion, an amount of background information is appropriate to facilitate understanding of the present invention. First, the system and method preferably establish CM 304 in each cell. CM 304 preferably controls a Boot-Inhibit-Bit (BIB). BIB causes the booting up to continue until a particular point. Specifically, all booting activities are performed (memory initialization, I/O initialization, and/or the like) excluding activities related to partition formation while the BIB is set. Accordingly, this permits the partition forming process to be delayed until service processor module 101 has had the opportunity to communicate an updated complex profile to each CM 304. Under ordinary circumstances, service processor module 101 will cause CM 304 to release the BIB. However, if CM 304 determines the service processor 101 is unavailable for some reason, CM 304 will perform BIB release automatically.

Also, each CM 304 is connected to or able to communicate with service processor module 101. Service processor module 101 may communicate information via a data structure, which is referred to as the complex profile, that details to which partition the respective cells belong. Service processor module 101 preferably communicates this information by distributing the complex profile to the respective cells via communication with each respective CM 304. The complex profile essentially provides a map or set of instructions defining the partition scheme of complex 100. In a preferred embodiment, the complex profile comprises a configured set. It shall be appreciated that the complex profile may contain significantly more information detailing how firmware may operate in the complex among other things. The configured set defines which cells are configured to be contained within a given partition. For example, the complex profile may include a data field associating cell 0 with partition 0; a data field associating cell 1 with partition 0; and a data field associating cell 2 with partition 1. It shall be appreciated that the configured set may refer to cells that are not necessarily present. A configured set may refer to cell slots which physically accept cell boards. Certain of the cell slots may be empty if complex 100 has not yet been expanded to include cells in each cell slot. The partition formation process adapts to missing cells as discussed in greater detail below.

Service processor module 101 preferably strictly controls the distribution and modification of the complex profile. Now, service processor module 101 places the complex profile on each cell via each CM 304 before BIB release. Also, each CM 304 preferably caches a previous revision of the complex profile or a discrete number of revisions of the complex profile. Accordingly, the present system and method preferably monotonically assign a revision identifier with the various versions of the complex profile. Thus, each time that the service processor module updates the complex profile on each CM 304—a new higher valued identifier is assigned to the latest revision.

Figure 2:
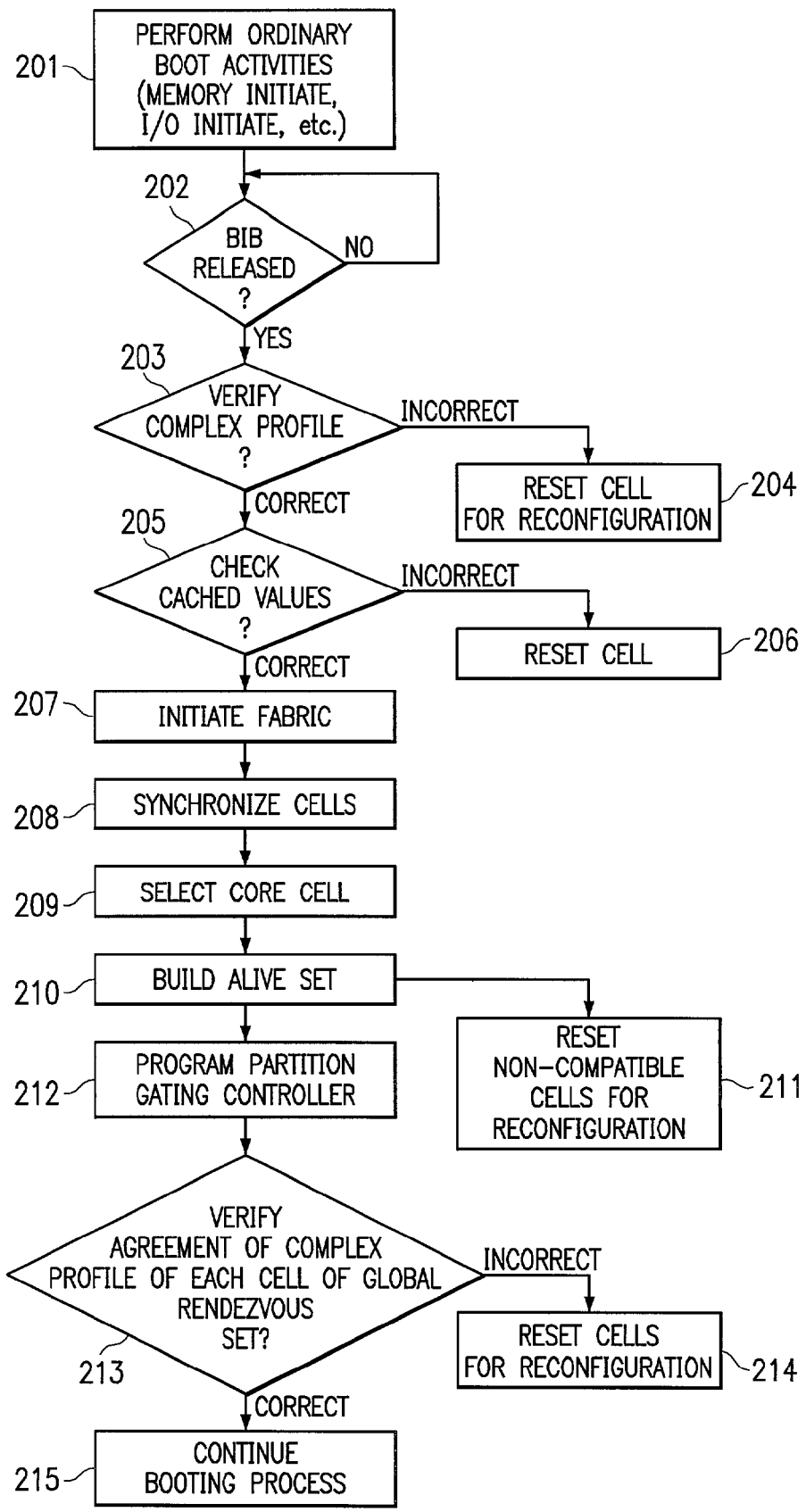
FIG. 2 depicts an exemplary flow chart of events associated with parallel partition formation.

Moving to a linear discussion of the partition formation process, FIG. 2 depicts a flow chart of exemplary events executed to form a partition from a group of independently executing cells. First, it shall be appreciated that firmware via PDH module defining executable instructions for a monarch processor is preferably utilized to perform a number of the following mechanisms. The term "monarch processor" is used, since each cell typically contains a number of processors. Thus, one processor of CPUs 302 is arbitrarily selected to manage the booting and partition formation activities associated with its respective cell. The other CPUs of CPUs 302 enter a spin-loop until needed for other activities. It shall be further appreciated that a number of the subsequent mechanisms are performed in a distributed manner, i.e. various mechanisms are occurring in parallel on monarch processors of separate cells in an independent manner. Also, the same mechanisms or events are not necessarily performed simultaneously on each cell. Instead, a significant time differential between similar events associated with different cells may exist.

In step 201, the ordinary cell booting process occurs (i.e., memory initialization, I/O initialization, and/or the like). Additionally, a hardware register or registers are preferably associated with each cell to reflect the boot-up state of the cell. Any number of states may be represented by the register(s). Also, it is preferred to cause the state register(s) to be set to null or cleared before the cell is connected to the fabric. Furthermore, it is preferred to allow other cells to be able to read each other's state register(s). By doing so, a number of mechanisms may be facilitated. First, if a particular cell's state register or registers remain at zero or a null state, it may be concluded that the particular cell is not making any progress and should be excluded from the partition formation process. Likewise, it is preferred to utilize a general purpose register or other predefined mechanism to communicate that a cell possesses core I/O (the minimal I/O necessary to continue booting). These registers will be referenced during the partition formation process as discussed in greater detail below.

After ordinary cell booting occurs, a spin-loop is executed until BIB release (step 202). Under ordinary circumstances, BIB release occurs after service processor module 101 has ensured that the various cells possess the most recent revision of the complex profile via CMs 304. However, it is possible that service processor module 101 may malfunction or otherwise be unavailable. Accordingly, CM 304 may cause BIB release if CM 304 determines that service processor module 101 is unavailable. Under this circumstance, the partition process will occur according to the cached complex profile previously stored on each cell. Thus, the present invention provides a significant advantage over known multi partition systems in that a single point of failure is avoided.

After BIB release, the cell determines whether it possesses a non-corrupted version of the most recent complex profile (step 203). The complex profile is preferably verified utilizing a checksum and utilizing the monotonic revision identifier. Specifically, data associated with the complex profile may be corrupted. Specifically, the complex profile is typically a large data structure and cannot be updated atomically. Instead, multiple write transactions are generally necessary to communicate the entire complex profile. If service process module 101 ceases to function before completing all of the write transactions associated with a given update, data corruption may occur. If the complex profile is invalid for any reason, reset for reconfiguration preferably occurs (step 204). A reset for reconfiguration is a special type of reset where BIB is set. This causes the cell to stop at BIB during the next boot allowing the cell to boot as far as possible as a single cell while allowing service processor module 101 to communicate a new complex profile (which may include reconfiguration data).

In step 205, cached data is compared against data in the current version of the complex profile. Specifically, certain data associated with the complex profile is utilized earlier in the booting process. However, service processor module 101 may update the complex profile at any time before BIB release. Thus, data utilized earlier in the booting process relies upon cached values which may be invalid due to a complex profile update. Accordingly, it is appropriate to determine whether the cached values match the present complex profile. If the values do not match, the cell resets to allow the new values of the new complex profile to take effect (step 206). This reset will delay the cell, but will not cause the cell to stop at BIB. The additional delay does not necessarily prevent the cell from joining the partition as will be discussed with respect to sync cell step 208. In addition, the cached values are preferably set to acceptable defined values for the very first boot procedure, since no previous complex profile can exist at the very first boot-up.

In step 207, fabric initialization occurs. Fabric initialization allows a cell to begin communication with other cells.

Figure 3:
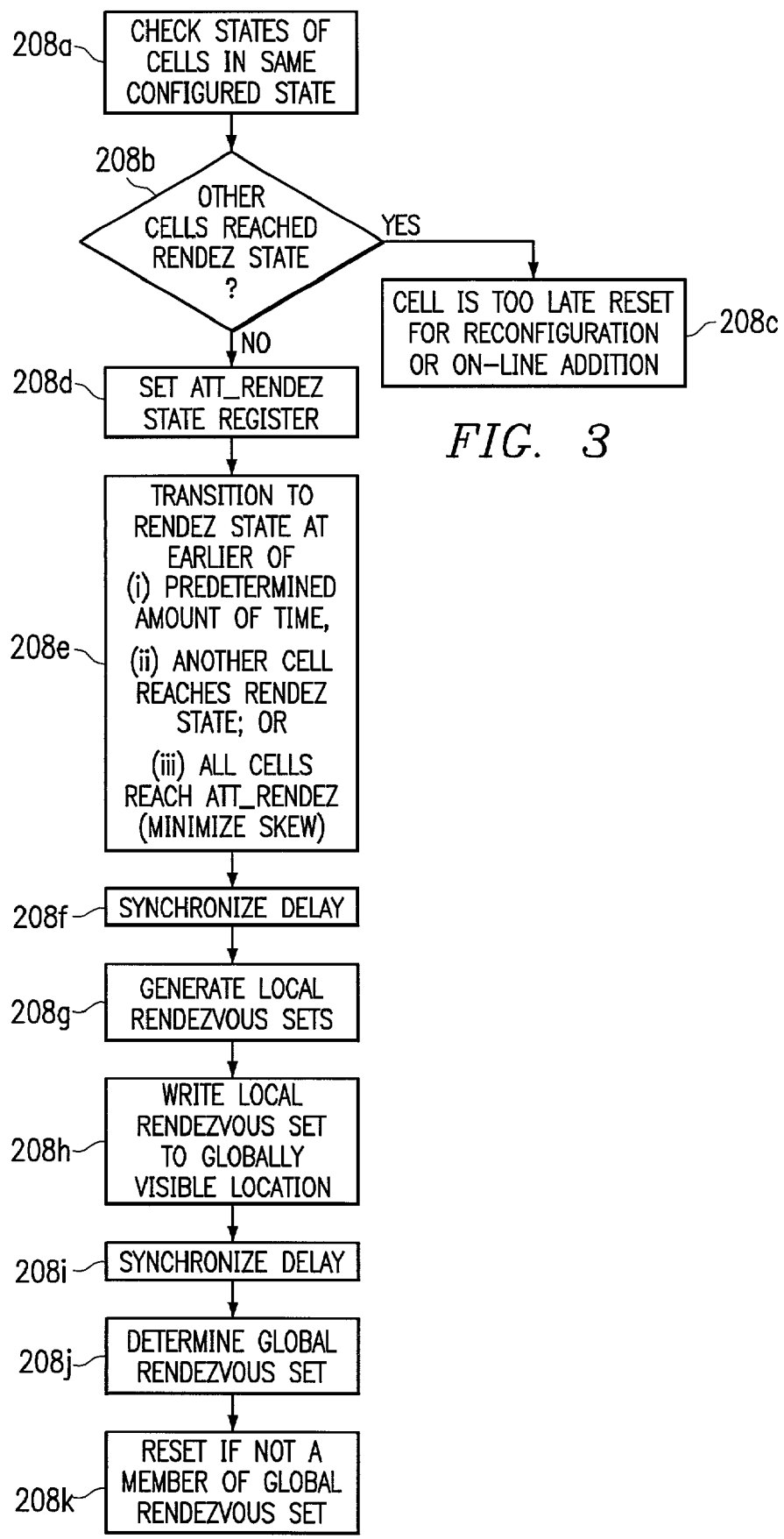
FIG. 3 depicts an exemplary flow chart of events related to a sync cell procedure.

After fabric initialization, the sync cell (step 208) mechanism occurs. During sync cell step 208, cells in a distributed manner utilizing their respective copies of the complex profile attempt to contact or communicate with other cells within the same configured set. FIG. 3 depicts sub-steps associated with sync cell step 208. Specifically, each cell attempts to determine if any other cell within the configured set has reached the RENDEZ state (step 208*a*). During sync cell step 208a, each present cell of a particular configured set (as defined by the their local copies of the complex profile) attempts to determine the states of other cells in the configured set via the respective register values. If another cell within the configured set has reached the RENDEZ state, the cell recognizes that it is too late to join the partition formation process (step 208b). The late cell then resets (step 208c). If no other cell has reached the RENDEZ state, the cell continues by setting a bit within the state register(s) to reflect that it is attempting to rendezvous (ATT_RENDEZ)—step 208d.

Now, it shall be appreciated that various cells of a configured set may require significant varying times to reach various states. For example, a given cell may comprise significantly more memory. Thus, its memory initialization will require more time, thereby delaying the cell from attempting to rendezvous. Alternatively, certain cells may be associated with different power modules. A certain cell may not be powered-up for a given amount of time thereby delaying the cell's boot-up process.

Sync cell step 208e preferably utilizes a time-out mechanism to adapt to this difficulty. Each cell within a configured set waits an arbitrary predetermined amount of time (ten minutes as an example) before automatically transitioning to the RENDEZ state. However, the waiting period is preferably initiated from the time when the first cell of the configured group reaches the ATT_RENDEZ state. Accordingly, a cell that has already reached the ATT_RENDEZ state transitions to the RENDEZ state, if it detects that another cell within the configured set has transitioned to the RENDEZ state. All cells in the configured set that have reached ATT_RENDEZ state will then cascade in response to the first cell reaching the RENDEZ state through the time-out mechanism. Thus, a defined upper limit is placed upon the delay utilized to accommodate significant time skews between cells of the configured set reaching the ATT_RENDEZ state. By utilizing a time-out mechanism, sync cell step 208 adapts to significant skews in cell arrival and yet does not fail if a cell does not becomes available due to malfunction, fabric failure, and/or the like. Of course, if it is detected that all cells of the configured set arrive before the time-out ends, it is appropriate to transition to the RENDEZ state to thereby cause cascading of other cells to the RENDEZ state.

It shall be appreciated that the preceding mechanism greatly reduces time skews between cells. For example, time skews of several minutes may exist before step 208e. The state synchronization performed in step 208e may reduce the time skews to microseconds or below. Furthermore, it shall be appreciated that the lock-step state progression as detailed in step 208e and elsewhere provides a very robust partition formation process. Specifically, a cell will transition to a given state. The cell will then wait for other cells to change to that same state. By doing so, several advantages may be achieved. For example, it may be determined at an earlier point which cells are not making progress during the boot procedure. Furthermore, the lock-step progression allows cells to complete various tasks in agreement, thereby minimizing the probability of a false rendezvous.

After removing the majority of the cell arrival skew, cells preferably wait an additional, smaller delay period (microseconds or less) in step 208f. The smaller delay period of step 208f provides an opportunity for all cells to transition to the RENDEZ state before cells begin to build their local rendezvous sets (see step 208g). Preferably, the predetermined amount of time equals the number of permissible cells within the complex multiplied by two, multiplied by a longest transaction time, and multiplied by a selected safety factor.

After exiting the delay operation, the present cells of the configured set attempt to determine local rendezvous sets in step 208g. Each cell attempts to determine which other cells of the configured set have reached the RENDEZ state. For example, the complex profile may define configured set N to comprise cells A, B, C, D. As noted, each cell will attempt to determine the state of each other cell of the configured set. If D was delayed for too long a period of time or was otherwise unavailable (i.e., it did not reach RENDEZ state by the end of the smaller delay period), cells A, B, C would exclude D from their respective local rendezvous sets. Also, cell A may be able to determine by examining the registers of cells B and C that cells B and C have reached the RENDEZ state. Cell A's local rendezvous set would constitute (A, B, C). Similarly, cell B may determine that cells A and C have reached RENDEZ state, causing its local rendezvous state to constitute (A, B, C). However, cell C may not be able to determine the state of cell A due to fabric failure. Cell C's local rendezvous set would then constitute (B, C). The local rendezvous sets are preferably represented as respective bit-masks. At step 208h, each individual cell writes its local rendezvous set to a globally visible location where the respective local rendezvous sets may be viewed by other cells.

At step 208i, another synchronization delay is preferably performed to allow the respective cells an opportunity to write their local rendezvous sets before other cells attempt to read the local rendezvous sets. The synchronization delay again preferably equals the number of permissible cells within the complex multiplied by two, multiplied by a longest transaction time, and multiplied by a selected safety factor.

The local rendezvous sets allow asymmetric communication capabilities to be determined. As previously noted, A was able to reach C. However, C was unable to reach A. Thus, bilateral communication between cells A and C cannot occur. In this situation, cell A or cell C would be eliminated or rejected. In step 208j, the global rendezvous set is built from the local rendezvous sets by excluding cells that are incapable of performing bilateral communication. In this situation, the global rendezvous set would constitute cells B and C. Thus, the partition process would continue utilizing only cells B and C, since bilateral communication may occur with respect to both cells B and C. The global rendezvous set may be determined by performing logic AND operations with respect to each local rendezvous set, thereby constructing the logical intersection of the local rendezvous sets. If a cell determines that it is not a member of the global rendezvous set, it resets for reconfiguration in step 208k. The cell may be added to a different partition during reconfiguration or alternatively the cell may be added to the same partition via an on-line addition.

After the end of sync cell step 208, a set of cells are identified that may continue the partition formation process. This set comprises all cells defined to belong within the given configured set that have arrived within a given amount of time and have demonstrated the ability to communicate bilaterally with every other cell of this set. Cells that arrive too late, are unavailable, or cannot communicate bilaterally are ignored and the partition forming process continues without those cells. For further discussion, this set of cells shall be referred to as the global rendezvous set.

At this point, it is appropriate to reemphasize the fact that there is no central point of control. Instead, the present system and method utilize a distributed approach. Specifically, each cell is independently executing its own sync cell function or routine in parallel in addition to functions or routines associated with other steps. Each cell executes its own sync cell function or routine based on its own values of its complex profile and ascertained bilaterally communication capabilities within the same configured set. By utilizing this approach, the system and method provide a much greater degree of availability over known solutions. In fact, service processor module 101 can be totally dead and the complex will configure into the respective partitions if there has been an initial distribution of the complex profile (i.e., if the service processor module 101 worked only one time). Likewise, the system and method adapt to cell delays, cell malfunctions, fabric failure, and/or the like. Moreover, it shall be appreciated that the same process occurs with respect to other configured sets. Namely, cells associated with other configured sets attempt to contact other cells within their respective configured sets in an attempt to generate respective local rendezvous sets and global rendezvous sets.

In step 209, a core cell is selected upon the basis of the global rendezvous set and upon the basis of information contained in the complex profile. The core cell may be selected by determining which cell within the global rendezvous set contains the requisite core I/O capabilities. The point of the core cell selection process is to agree upon utilizing a single cell that will continue the partition forming process and to continue the booting process beyond the partition formation stage, i.e., instantiation of the operation system, boot handler, user interface, and/or the like. Core cell selection step 209 is preferably performed by utilizing the same algorithm in each cell of a given global rendezvous set and utilizing the complex profile and ascertained core I/O capabilities as an input to the algorithm. Utilizing this approach, each cell of the global rendezvous set may determine if it is the selected core cell or not. If not, the cell enters a spin-loop to be subsequently awakened. If the cell is the core cell, the core cell continues the partition formation process. The identity of the core cell is preferably communicated to service processor module 101. By performing core cell selection, the present system and method further increase the robustness of the partition formation process by adapting to missing I/O capabilities, malfunctioning I/O capabilities, and/or the like.

In step 210, the core cell builds the alive set. The alive set is a descriptive term utilized to designate the subset of cells from the global rendezvous set that are compatible. For example, it is contemplated that several revisions or generations of firmware may be utilized in different cells. The core cell analyzes each cell in the global rendezvous set to determine if their firmware is compatible with the firmware of the core cell. Other compatibility analysis may be performed. For example, CPU or cabinet compatibility between cells may be analyzed. Any cells that are determined to be incompatible for any reason are excluded. Thus, the alive set is constructed to thereby represent present, bilaterally communication capable, and compatible cells that are using the same complex profile. The core cell preferably communicates the alive set to every cell of the alive set to implement partition gating. Non-compatible cells reset for reconfiguration (step 211).

In step 212, the partition gating functionality is programmed onto each PA 301 of the alive set. Partition gating is utilized to create or enforce the partition scheme. Specifically, each PA 301 prevents operations from other partitions from adversely affecting operations of the partition. For example, only cells contained within the alive set may issue write transactions within the particular partition.

In step 213, the core cell preferably verifies that cells within the global rendezvous cell are utilizing the same complex profile. Specifically, the core cell utilizes the monotonic revision identifier and the checksum associated with the complex profile to perform the verification step. If any cell is determined to be utilizing a different revision of the complex profile, all of the cells are reset for reconfiguration (step 214). By performing complex profile verification, the robust quality of the present system and method is augmented.

In step 215, the core cell continues booting the partition. In general, this may involve memory interleaving, locating a boot device, loading and executing the operating system, and/or the like. The continuation of the booting process after partition formation is beyond the scope of the present invention and therefore will not be discussed in any appreciable detail.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for synchronizing a portion of cells of a configured set of cells to form a partition, comprising the steps of:
   (a) reaching a first rendezvous state;
   (b) delaying formation of the partition to allow other cells associated with said partition to reach said first rendezvous state until the earlier of:
      (i) a predetermined time;
      (ii) another cell of the portion of cells reaches the second rendezvous state; and
      (iii) all cells of said configured set of cells reach the first rendezvous state; and
   (c) transitioning cells that reached the first rendezvous state to a second rendezvous state;
   wherein cells of said portion determine which cells reached the second rendezvous state in order to exclude and include cells in the formation of the partition, and cells of said portion independently execute steps (a) through (c) in parallel.

2. The method of claim 1 further comprising the steps of:
   (d) constructing, for each cell of the portion of cells, a local rendezvous set comprising detected cells associated with said partition that have reached the second rendezvous state; and
   (e) writing said local rendezvous set to a visible location;
   wherein cells associated with said partition that have reached said second rendezvous state independently execute steps (d) through (e) in parallel.

3. The method of claim 1 further comprising the step of:
constructing a global rendezvous set from constructed local rendezvous sets, wherein the global rendezvous set represents a logical intersection of said constructed local rendezvous sets.

4. The method of claim 3 further comprising the step of:
determining a core cell from said global rendezvous set.

5. The method of claim 4 further comprising the step of:
determining compatible cells of said global rendezvous set as an alive set, wherein said step of determining compatible cells is performed by said core cell.

6. The method of claim 5 further comprising the step of:
programming partition gating controllers to limit adverse transactions associated with a partition to said alive set.

7. The method of claim 6 further comprising to step of:
establishing an operating system on said partition.

8. The method of claim 1 wherein complex information is utilized to identify other cells of the configured set.

9. The method of claim 8 wherein said complex information is obtained from a service processor.

10. The method of claim 8 wherein said complex information is retrieved from a cache.

11. A cell for use in a multi partition computer system, wherein said cell comprises partition instructions utilized to join a partition, comprising:
a processor to execute said partition instructions utilized to join said partition;
a firmware device to said partition instructions utilized to join said partition;
code to set a register reflecting a first rendezvous state;
code to delay partition formation operations after setting said register to reflect said first rendezvous state until the earliest of:
(i) a predetermined time;
(ii) another cell of the configured set of cells reaches the second rendezvous state; and
(iii) all cells of said configured set of cells reach the initial rendezvous state;
code to transition to a second rendezvous state after delaying partition formation operations; and
code to determine whether other cells also transitioned to the second rendezvous state to exclude and include cells in order to form the partition.

12. The cell of claim 11 wherein said partition instructions are executed in parallel in association wit partition instructions executed by other cells of a configured set.

13. The cell of claim 12 further comprising:
code for constructing a local rendezvous set comprising detected cells of the configured set that have reached the second rendezvous state; and
code for writing said local rendezvous set to a visible location.

14. The cell of claim 13 further comprising:
code for retrieving local rendezvous sets generated by other cells of said configured set; and
code for constructing a global rendezvous set from constructed local rendezvous sets; wherein the global rendezvous set represents a logical intersection of constructed local rendezvous sets.

15. The cell of claim 14 further comprising:
code for determining a core cell from said global rendezvous set; and
code for determining compatible cells of said global rendezvous set as an alive set, wherein said code for determining compatible cells is executed when the cell is determined to be the core cell.

16. The cell of claim 15 further comprising;
code for programming at least one partition gating controller to limit adverse transactions associated with a partition to said alive set.

17. The cell of claim 12 wherein complex information is utilized to identify other cells of the configured set.

18. The cell of claim 17 wherein said complex information is retrieved from a cache.

19. A method of forming partitions of a computer system according to configuration data identifying cells to form said partitions, wherein each cell comprises a set of respective computing resources, comprising:
setting a respective register, by each cell, to indicate completion of a subset of boot operations;
transitioning to a partition formation state, by each cell, at the earliest of (i) an expiration of a timer, (ii) all cells, within the same partition as indicated in said configuration data, setting their respective registers, and (iii) another cell within the same partition indicating transition to said partition formation state;
attempting to determine, by each cell, which other cells belonging to the same partition, have transitioned to said partition formation state to generate a respective local partition set;
writing, by each cell, said local partition sets to a globally accessible location;
delaying, by each cell, an amount of time after performing said writing; and
forming partitions using common information in said local partition sets.

20. The method of claim 19 further comprising:
resetting cells that are identified as belonging to a partition in said configuration data and that are not identified in common information in said local partition sets.

21. The method of claim 19 wherein a copy of said configuration data is stored on each cell.

22. The method of claim 21 further comprising:
operating a service processor to update copies of said configuration data on said cells before said transitioning is performed.

23. The method of claim 21 further comprising:
analyzing, by each cell, its respective copy of said configuration data to identify data corruption within said copy of configuration data.

24. The method of claim 19 wherein said forming partitions comprises:
programming logic coupled to said cells to limit input/output (IO) transactions between said cells.

25. The method of claim 19 wherein said forming partitions comprises:
initializing a respective operating system on each partition.

* * * * *

UNITED STATES PATENT AND TRADEMARK OFFICE
CERTIFICATE OF CORRECTION

PATENT NO. : 7,103,639 B2
APPLICATION NO. : 09/730221
DATED : September 5, 2006
INVENTOR(S) : Andrew C. Walton et al.

Page 1 of 2

It is certified that error appears in the above-identified patent and that said Letters Patent is hereby corrected as shown below:

On sheet 1 of 3, Fig. 1, delete "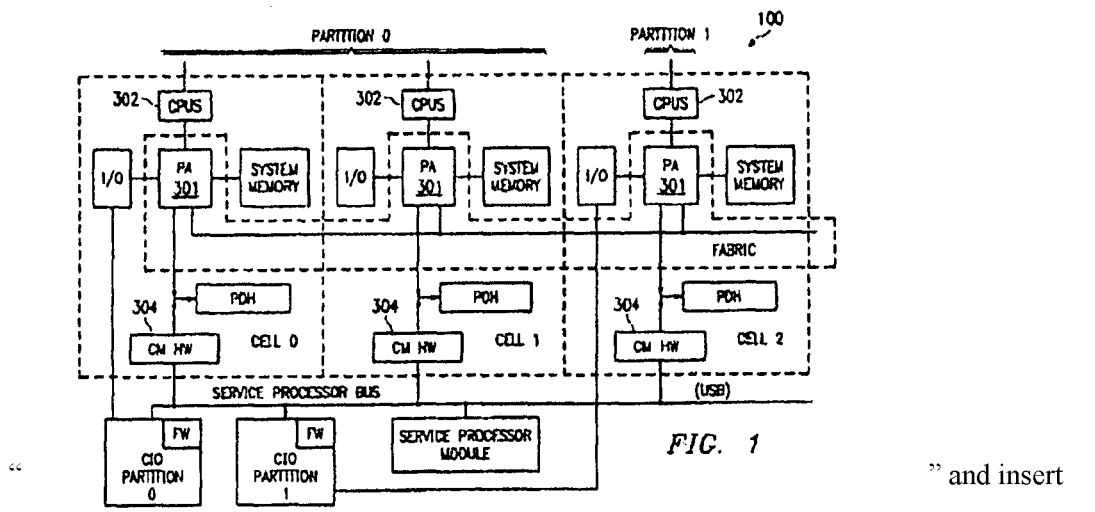" and insert

Signed and Sealed this

Fifteenth Day of June, 2010

David J. Kappos
*Director of the United States Patent and Trademark Office*

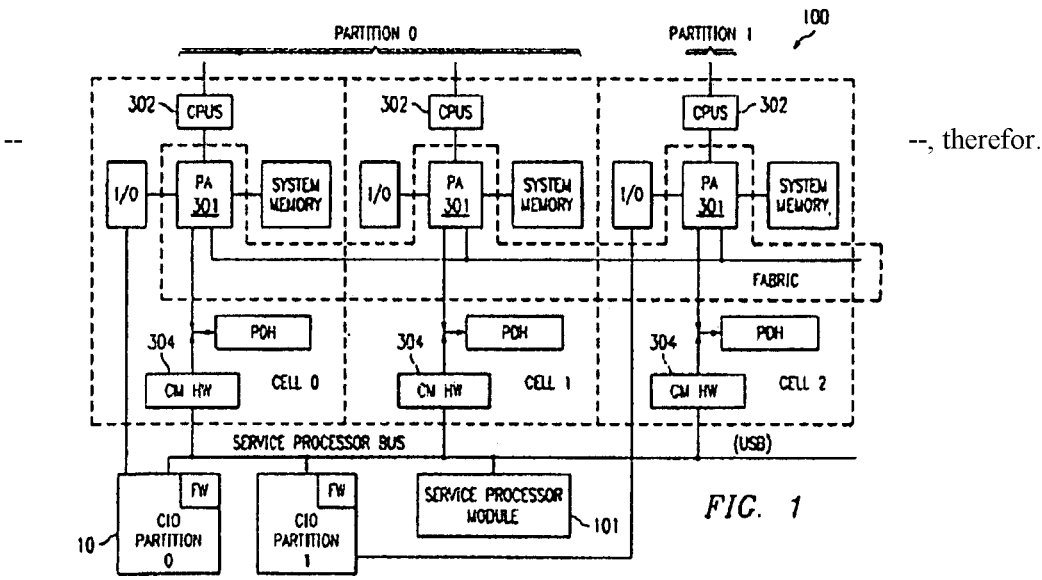

--, therefor.

FIG. 1

In column 4, line 12, delete "to" before "individual".

In column 11, line 15, in Claim 7, delete "to" and insert -- the --, therefor.

In column 11, line 28, in Claim 11, insert -- store -- before "said".

In column 11, line 46, in Claim 12, delete "wit" and insert -- with --, therefor.

In column 11, line 59, in Claim 14, delete "sets;" and insert -- sets, --, therefor.

In column 12, line 8, in Claim 16, delete "comprising;" and insert -- comprising: --, therefor.

In column 12, line 55, in Claim 24, delete "(IO)" and insert -- I/O --, therefor.